(No Model.)
T. DUNN.
PNEUMATIC TIRE.
No. 582,523. Patented May 11, 1897.
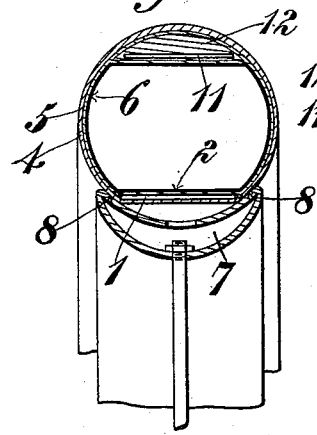
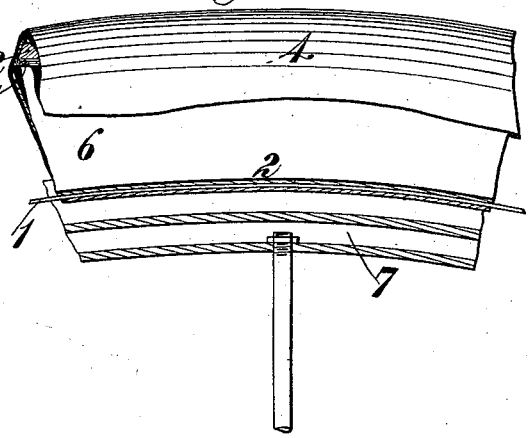
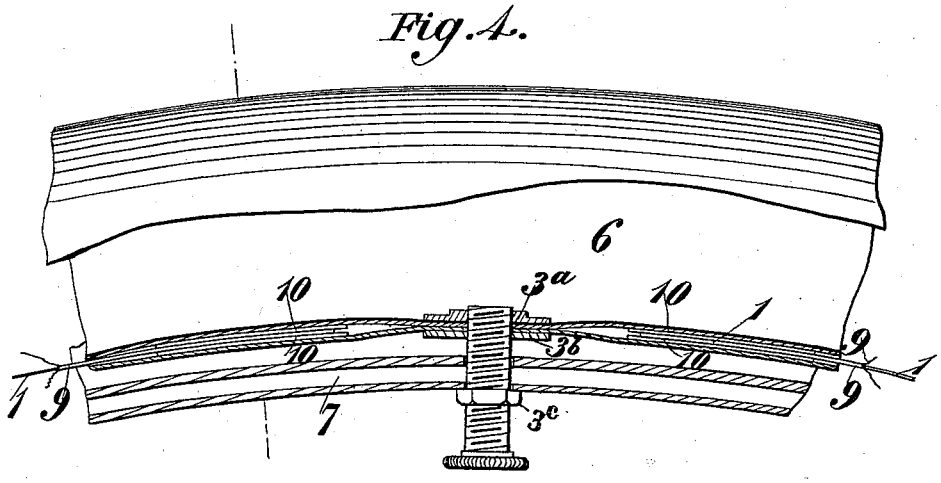
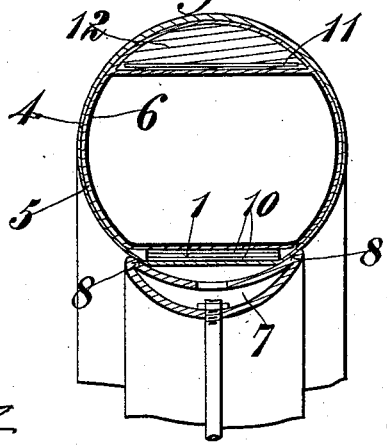
Witnesses
Arthur Woolmans
W. Cross
Inventor
Thomas Dunn

UNITED STATES PATENT OFFICE.

THOMAS DUNN, OF LONDON, ENGLAND.

PNEUMATIC TIRE.

SPECIFICATION forming part of Letters Patent No. 582,523, dated May 11, 1897.

Application filed January 24, 1893. Serial No. 459,585. (No model.)

*To all whom it may concern:*

Be it known that I, THOMAS DUNN, a subject of the Queen of Great Britain and Ireland, residing at 83 Tierney Road, Brixton Hill, London, in the county of Surrey, England, have invented Improvements in or Relating to Pneumatic Tires, of which the following is a specification.

This invention has reference to improvements in or applicable to pneumatic tires, whereby the same can be firmly attached to wheel-rims. Various means have heretofore been proposed and used for this purpose, but so far as I know they are all more or less complicated in construction or troublesome to apply, or require a special construction of tire or wheel-rim, so that the tires and wheel-rims are not interchangeable, the tires requiring to be fitted on rims specially designed for them and the rims being unsuitable for any tires but those for which they were constructed.

Now my invention has reference to improvements in or applicable to pneumatic tires, whereby such a tire when placed upon a wheel-rim and inflated will become automatically and effectually fixed upon the wheel-rim, which may be of various forms in cross-section and such as are commonly in use. For this purpose I provide within the pneumatic tire near the inner or under side thereof—that is to say, near its inner circumference and next the wheel-rim to which the tire is to be applied—a strip of suitable material, such as sheet-steel, that is rigid transversely and flexible longitudinally, but not extensible in length. This strip, which may advantageously extend around or nearly around the tire, may be arranged between the air-tube and the canvas or other covering within which the air-tube is inclosed or held, so as to be subjected to the pressure of the air within the air-tube. A tire thus constructed should be made of such a diameter as to so fit the rim that it will not be liable to come off the wheel-rim, to which it is to be applied when deflated, but so that it can be easily pulled off. Then since on inflation an ordinary pneumatic tire when free will while expanding in its outside diameter simultaneously contract in length and inside diameter, a tire constructed according to this invention will on inflation grip the wheel-rim tightly, and the circular metal strip being also contracted in diameter will cause the grip of the tire to be exerted all around the wheel-rim, thereby assisting in making the tire secure at every point. The metal strip may advantageously be inclosed in a sheath of woven material embedded within the material of which the tire is made, so that the strip can readily contract and expand in diameter when the tire is inflated and deflated, respectively. The metal strip should be slightly narrower than the rim of the wheel to which the tire is to be fixed, and the wheel-rim should be of such a cross-section as to receive the tire and prevent it being pushed off laterally.

In the accompanying drawings, Figure 1 is a cross-section, and Fig. 2 a side elevation, partly in section, in a plane at right angles to Fig. 1, of a pneumatic tire constructed according to this invention and applied to a wheel-rim of ordinary construction. Figs. 3 and 4 are similar views to Figs. 1 and 2, respectively, illustrating a slightly-modified construction.

1 is a flat strip of sheet metal, such as steel, arranged near the inner side or circumference 2 of the pneumatic tire, which in other respects may be variously constructed, as well understood. In the examples shown the metal strip is of such a length as to extend nearly entirely around the tire, the air-inlet pipe 3, with non-return valve, being placed between its ends, as shown more clearly in Fig. 4. It is shown arranged between the outer tubular covering 4 and an intermediate tube 5, within which the air-tube 6 is placed; but it could obviously be placed between these two latter tubes, or even within the air-tube, so long as it will be subjected when in use to the pressure of the air within the air-tube and will clamp the inner circumferential portion of the tire between its edges or sides and the wheel-rim 7, as shown at 8 8.

To secure the ends of the metal strip, it is only necessary to employ along with it one of those valves which are screwed onto the wheel-rim.

In the example shown the pipe 3 is screwed into a square or rectangular flat plate 3ᵃ, corresponding in breadth with the steel band and bearing against the inner side of the air-tube. The pipe passes through a second square plate 3ᵇ, of the same size as the first, and the wheel-rim, so that upon tightening up a screw-nut 3ᶜ on the outer portion of the pipe the inner portion of the tire will be firmly held to the wheel-rim, as shown in Fig. 4, and the ends of the metal strip thereby held in place.

9 is a sheath of woven material embedded in the tire and within which the metal strip is arranged. This sheath permits the metal strip to move in the direction of its length without undue resistance while the tire is contracting and expanding upon inflating and deflating it. To still further lessen resistance to such movement, each end of the sheath may be provided with a pair of metal plates 10, arranged to form a guide within which the ends of the strip can freely slide.

By the construction described the tire will be tightly held all around the wheel-rim along two circumferential lines by a force that is in proportion to the area of the metal strip and the air-pressure within the air-tube and any force tending to displace the tire from the wheel-rim at any point thereof will, owing to the presence of the metal strip, be resisted by the whole of the pressure upon the metal strip all around the wheel, whereas in the absence of the metal strip the pressure acting to prevent displacement would be simply that due to the internal air-pressure upon the portion of the tire subjected to the displacing force.

To obtain the best results, the metal strip should be stiff or rigid in a transverse direction, so that the pressure thereon will not cause the strip to bend and adapt itself to the cross-section of the wheel-rim, but will permit of the pressure being transmitted to the sides thereof, so as to hold the tire upon the wheel-rim along two circumferential lines.

To obtain sufficient rigidity in a transverse direction with the minimum of weight, the metal strip may be transversely fluted or finely corrugated, but not to such an extent as to make the strip elastic in the direction of its length. For this reason two strips might be used, one of which may be transversely corrugated, while the other is plain. I have obtained satisfactory results with a plain strip of sheet-steel one inch in width and about one sixty-fourth of an inch thick, the pneumatic tire being twenty inches in diameter and one and one-half inches in width and the wheel-rim being one and one-fourth inches in width.

In each of the examples shown the metal strips are shown applied to pneumatic tires constructed with a corrugated metal protecting-band 11 embedded in a strip 12 of elastic material arranged between the outer circumference of the air-tube 6 and the outer covering 4, as and for the purposes described in the specification of my United States Patent, dated June 28, 1892, No. 477,996.

My invention may be applied to single-tube pneumatic tires or to tires of the kind in which the air-tube is held within an outer separate covering that is not continuous in cross-section, but in the latter case the edges of the cover should be connected together in any known or suitable manner—as, for example, by lacing—so that the tire with metal strip is complete in itself and can be removed from a wheel-rim without liability of the metal strip becoming detached from the tire, and the tire can be afterward easily replaced upon the wheel-rim.

The wheel-rim 7 in the example shown is of the ordinary concave pattern. As will be obvious, however, pneumatic tires constructed as described can be applied to wheel-rims of various constructions, a rim flat on the outside with small lateral flanges—that is to say, of ⌣ shape in cross-section—being very suitable, while deeply-channeled rims are undesirable.

I am aware that it has heretofore been proposed to use circular metal rings or strips for securing pneumatic tires upon wheel-rims; but in the case of the rings it was necessary that they should be made accurately to fit the wheel on which the tire was to be placed, whereas by my construction I find the tire may be made to fit wheels of any size within at least an inch in circumference either way of the normal size the tire was designed to fit, and in the case of the strips they were all furnished with mechanical couplings for the purpose of drawing their ends together and the application of these couplings required troublesome alterations to the wheels, which has so far prevented these constructions coming into general use. A further objection to these former constructions is that wheel-rims of special construction are necessary in most cases for such tires, whereas my improved tires can, as hereinbefore explained, be applied to any ordinary cycle-wheel rim of slight concavity or to any ordinary vehicle-wheel without any alterations thereto, excepting that of drilling a hole in the rim to receive the air-valve.

What I claim is—

1. A pneumatic tire comprising an inner air-tube, an outer tubular covering such as set forth, a circular sheath arranged between said tube and covering, a circular strip of flat metal arranged within said sheath so as to be capable of longitudinal movement, and metal plates arranged near the ends of said sheath so as to form smooth guides within which the inner free ends of said strip can slide substantially as herein described for the purposes specified.

2. The combination with a wheel-rim of channel form, of a pneumatic tire having a tubular outer cover and a circular metal strip arranged centrally at the inner circumference of said tire between the outer cover and air-tube so as to press the former upon the wheel-rim along two circumferential lines when the tire is inflated, said metal strip having its ends disconnected and free to expand or contract during inflation and deflation of the tire, and means disconnected from said strip for holding the ends thereof in place after inflation of the tire, substantially as herein described.

3. The combination of an inflatable tire adapted at its outer periphery to expand and at its inner periphery to contract when inflated, a transversely-rigid metallic band of less length than the inner periphery of the tire and secured adjacent said periphery, and an air-inlet for the tire on its inner periphery and between the separated terminals of the curved metallic band, whereby when the band is caused to move longitudinally with respect to the inner tire periphery by inflation or deflation the inlet will not be disturbed, substantially as shown and described.

In testimony whereof I have signed my name to this specification in the presence of two subscribing witnesses.

THOMAS DUNN.

Witnesses:
  A. H. REED,
  WM. THOS. MARSHALL.